United States Patent [19]
Kishimoto

[11] Patent Number: 6,160,595
[45] Date of Patent: *Dec. 12, 2000

[54] LIQUID CRYSTAL DISPLAY WITH EDGE-LIT BACKLIGHT WHICH USES AMBIENT LIGHT INJECTED BETWEEN REFLECTOR AND CHOLESTERIC POLARIZER

[75] Inventor: Keiko Kishimoto, Osaka, Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,616

[22] Filed: Jun. 9, 1997

[30] Foreign Application Priority Data

Jun. 11, 1996 [JP] Japan ..................... 8-149418

[51] Int. Cl.$^7$ .................................................. G02F 1/1335
[52] U.S. Cl. ................................ 349/61; 349/65; 349/115
[58] Field of Search .................................... 349/115, 104, 349/106, 194, 176, 98, 65, 62, 61

[56] References Cited

U.S. PATENT DOCUMENTS

| | | | |
|---|---|---|---|
| 4,618,216 | 10/1986 | Suzawa | 349/65 |
| 5,303,075 | 4/1994 | Wada et al. | 349/181 |
| 5,319,478 | 6/1994 | Funfschilling et al. | 349/194 |
| 5,329,387 | 7/1994 | Yanagisawa et al. | 349/181 |
| 5,418,631 | 5/1995 | Tedesco | 349/176 |
| 5,506,704 | 4/1996 | Broer et al. | 359/63 |
| 5,712,694 | 1/1998 | Taira et al. | 349/175 |
| 5,731,886 | 3/1998 | Taber et al. | 359/499 |
| 5,793,456 | 8/1998 | Broer et al. | 349/98 |
| 5,808,713 | 9/1998 | Broer et al. | 349/98 |
| 5,825,444 | 10/1998 | Broer et al. | 349/98 |
| 5,899,551 | 5/1999 | Neijzen et al. | 349/115 |

FOREIGN PATENT DOCUMENTS

| | | |
|---|---|---|
| 6-230362 | 8/1994 | Japan . |
| 6-281814 | 10/1994 | Japan . |

OTHER PUBLICATIONS

D.J. Broer et al., "S32–3 Reflective Cholesteric Polariser Improving the Light Yield of Back–and Side–Lighted Flat Panel Liquid Crystal Displays," Asia Display '95, pp. 735–737, Oct. 7, 1995.

*Primary Examiner*—Kenneth Parker
*Attorney, Agent, or Firm*—David G. Conlin; George W. Neuner; Dike, Bronstein, Roberts and Cushman LLP

[57] ABSTRACT

An object of the invention is to obtain brighter display in a liquid crystal display apparatus. Light of all the wavelengths in the visible range is converted into circularly polarized light by a first polarization condition converting member, converted into linearly polarized light by a second polarization condition converting member and is modulated by a liquid crystal display device. Then, transmission and block of the light is controlled by a polarizer. Specifically, one of the dextrorotatory circularly polarized light and the levorotatory circularly polarized light is reflected by a spectral member included in the first polarization condition converting member, converted into the other circularly polarized light by a reflecting member included in the first polarization condition converting member and supplied again to the spectral member. The other circularly polarized light is transmitted by the spectral member. Thus, by converting light of all the wavelengths in the visible range into circularly polarized light and then converting the circularly polarized light into linearly polarized light, in principle, 100% of the light is incident on a liquid crystal display device, so that brighter display is achieved.

11 Claims, 6 Drawing Sheets

LIQUID CRYSTAL DISPLAY WITH EDGE-LIT BACKLIGHT WHICH USES AMBIENT LIGHT INJECTED BETWEEN REFLECTOR AND CHOLESTERIC POLARIZER

BACKGROUND OF THE INVENTION

1. Field of the Invention

The present invention relates to a liquid crystal display apparatus which achieves comparatively bright display, and more particularly, to a super twisted nematic (STN) liquid crystal display apparatus used as both reflection and transmission types. The invention also relates to a terminal apparatus using the liquid crystal display apparatus.

2. Description of the Related Art

In transmission-type, semi-transmission-type and reflection-type liquid crystal display apparatuses, the incident light passes through the polarizer at least twice before exiting from the liquid crystal display apparatus. The transmission-type liquid crystal display apparatus typically includes a pair of polarizers sandwiching at least a liquid crystal display device therebetween, and the light incident on the side of one polarizer exits from the side of the other polarizer. The reflection-type liquid crystal display apparatus typically includes a polarizer, a liquid crystal display device, a polarizer and a reflector disposed In this order, and the light incident on the side of one polarizer is reflected by the reflector to exit from the side of the other polarizer. For this reason, the transmissivity remarkably decreases, so that bright display is not obtained. Particularly, in the reflection-type liquid crystal display apparatus, there are shaded portions in the display because of a parallax due to the distance from the liquid crystal display device to the reflector. This markedly degrades the visibility.

Japanese Unexamined Patent Publication JP-A 6-230362 (1994), for example, discloses an art to solve the degradation of the visibility due to the parallax and an art to increase the brightness with respect to a reflection-type twisted nematic (TN) liquid crystal display apparatus. Specifically, on one side of the liquid crystal display device, a polarizer is disposed, and on the other side of the device, a ¼ wave plate, a cholesteric liquid crystal polymer film and a light absorber are disposed in this order from the side of the liquid crystal display device to be in close contact with each other. Unnecessary light incident on the side of the polarizer is absorbed by the light absorber so that only light of one given wavelength again passes through the polarizer to exit. By using the ¼ wave plate and the cholesteric liquid crystal polymer film as the polarizer on the side of the reflector and using the light absorber instead of the reflector to absorb the unnecessary light, the distance from the liquid crystal display device to the reflector is decreased to solve the degradation of the visibility due to the parallax, and by using only one polarizer, the brightness is increased.

"Asia Display '95 S47-3" (held on Oct. 7, 1995) discloses an art of applying a cholesteric reflective polarizer (CRP) in which a cholesteric liquid crystal film having a continuous pitch length and a ¼ wave plate is combined, to a backlighting system for a transmission-type liquid crystal display apparatus comprising two polarizers sandwiching a TN liquid crystal display device therebetween. In this art, the CRP converts circularly polarized light into linearly polarized light which is supplied to the liquid crystal display apparatus.

In JP-A 6-230362 (1994), since the light incident on the side of the polarizer is reflected by the light absorber to again pass through the polarizer, the light incident on the liquid crystal display device has already passed through one polarizer, so that only 50% of the incident light is incident on the liquid crystal display device. The light from the liquid crystal display device is reflected and again passes through the polarizer via the liquid crystal display device, so that the amount of exiting light is further reduced to approximately 50% of the light incident on the liquid crystal display device. Thus, the use efficiency of the light is comparatively inferior. Additionally, in this prior art, since only polarized light of a specific wavelength is converted into circularly polarized light by the cholesteric liquid crystal polymer film, the coloration of the display occurs. In the arts disclosed in "Asia Display '95 S47-3", since a CRP is applied to a liquid crystal display apparatus comprising two polarizers sandwiching a liquid crystal display device therebetween, the use efficiency of the light is inferior.

SUMMARY OF THE INVENTION

An object of the invention is to provide a liquid crystal display apparatus achieving bright display and a terminal apparatus using the liquid crystal display apparatus.

The invention is a liquid crystal display apparatus comprising:

first means for converting all of light of all wavelengths in a visible range into circularly polarized light;

second means for converting the circularly polarized light obtained through the conversion by the first converting means into linearly polarized light;

a liquid crystal display device for modulating the linearly polarized light obtained through the conversion by the second converting means; and a polarizer for controlling transmission and block of the light which has exited from the liquid crystal display device, wherein the first converting means includes:

spectral means for reflecting one of dextrorotatory circularly polarized light and levorotatory circularly polarized light of the circularly polarized light and transmitting the other circularly polarized light, the spectral means being composed of a polymer liquid crystal film formed of cholesteric liquid crystal whose liquid crystal molecules are twisted along a thickness; and reflecting means disposed at a distance from the spectral means for converting the one circularly polarized light reflected by the spectral means into the other circularly polarized light to supply the other circularly polarized light again to the spectral means, and wherein the second converting means is composed of a ¼ wave plate formed of a uniaxially drawn polymer film.

According to the invention, light of all the wavelengths in the visible range is converted into circularly polarized light by the first converting means, converted into linearly polarized light by the second converting means, and modulated by the liquid crystal display device. Then, transmission and block of the light is controlled by the polarizer. Specifically, at the first converting means, one of the dextrorotatory circularly polarized light and the levorotatory circularly polarized light is reflected by the spectral means and converted into the other circularly polarized light by the reflecting means to supply the other circularly polarized light again to the spectral means. The other circularly polarized light is transmitted by the spectral means.

Thus, in principle it is possible to enter 100% of the light enters into the liquid crystal display device, and as a result, brighter display can be obtained.

The invention is characterized in that a light incident plane of the spectral means and a light reflecting plane of the reflecting means are disposed opposite to each other to form a predetermined angle.

According to the invention, the light incident from between the light incident plane of the spectral means and the light reflecting plane of the reflecting means is directly introduced into the spectral means to be incident on the liquid crystal display device, so that the incident light is effectively used.

The invention is characterized in that the liquid crystal display apparatus further comprises a light source and that the first converting means further includes means disposed between the spectral means and the reflecting means for directing the incident light from the light source.

According to the invention, the light from the light source is directed to the spectral means by the light directing means disposed between the spectral means and the reflecting means. With the presence of the light directing means, the light from the light source is effectively used.

The invention is characterized in that the liquid crystal display apparatus further comprises optical compensation means for compensating coloration of light having exited from the liquid crystal display device and that the polarizer controls transmission and block of the light whose coloration compensation has been conducted by the optical compensation means.

According to the invention, the coloration of the light having exited from the liquid crystal display device is compensated by the optical compensation means. As a result, display without any coloration is obtained.

The invention is characterized in that a product d·Δn of a thickness d of a liquid crystal layer of the liquid crystal display device and a refractive index anisotropy Δn is selected to be in a range between 0.77 μm and 0.90 μm, that the optical compensation means has two phase difference plates each having a retardation value which is selected to be in a range between 0.39 μm and 0.46 μm, and that an angle between axes of retardation of the phase difference plates is selected to be in a range between 20° and 40°.

According to the invention, by setting the values within the ranges, the tone of the background when no voltage is applied is brighter and approaches achromatic, so that stable black and white display is obtained.

The invention is characterized in that a product d·Δn of a thickness d of a liquid crystal layer of the liquid crystal display device and a refractive index anisotropy Δn is selected to be in a range between 0.77 μm and 0.90 μm, that the optical compensation means has a retardation value which is selected to be in a range between 0.89 and 0.95 times the product dΔn of the thickness d of the liquid crystal layer of the liquid crystal display device and the refractive index anisotropy Δn and rotates light in an opposite direction but by the same angle as in the liquid crystal display device.

According to the invention, by setting the values within the ranges, the tone of the background when no voltage is applied is also brighter and approaches achromatic, so that stable black and white display is obtained.

The invention is a terminal apparatus provided with any one of the liquid crystal display apparatuses described above and ambient light introducing means for effectively introducing ambient light into a gap between the spectral means and the reflecting means of the liquid crystal display apparatus.

According to the invention, the ambient light is introduced by the ambient light introducing means into the gap between the spectral means and the reflecting means of the liquid crystal display apparatus. By doing so, a terminal apparatus, for example, of a portable type is realized.

BRIEF DESCRIPTION OF THE DRAWINGS

Other and further objects, features, and advantages of the invention will be more explicit from the following detailed description taken with reference to the drawings wherein:

FIG. 9 is a perspective view showing the appearance of a portable terminal apparatus 22 provided with the liquid crystal display apparatus 1a.

DETAILED DESCRIPTION OF THE PREFERRED EMBODIMENTS

Figure 1:
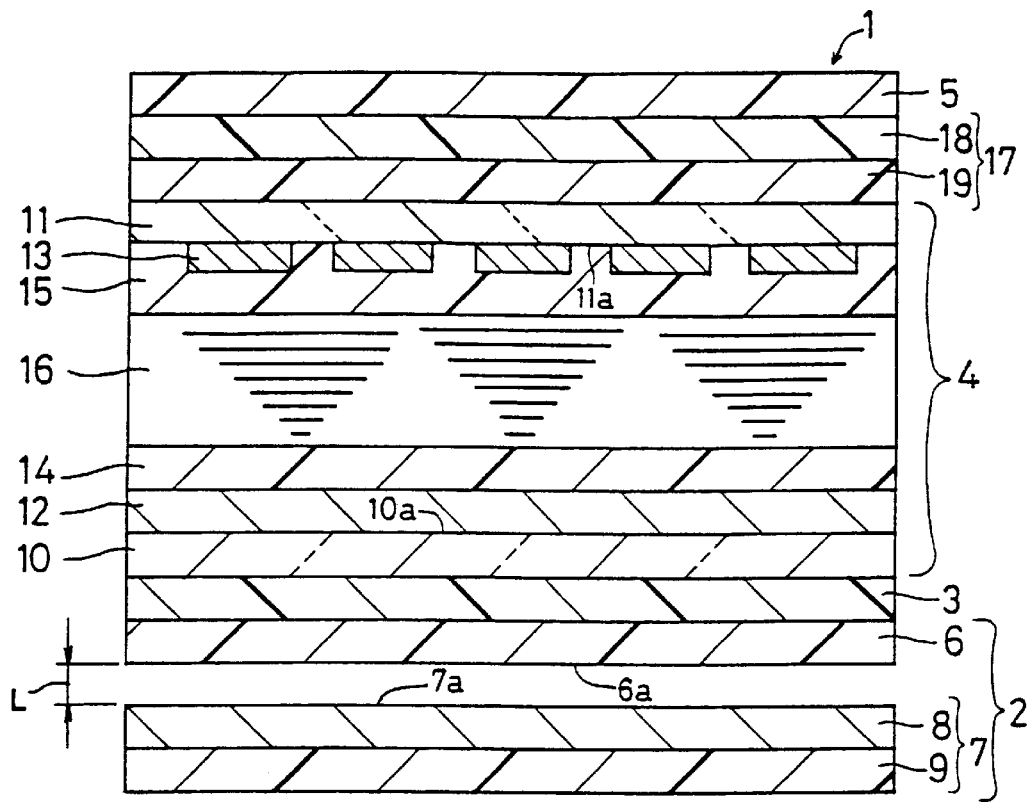
FIG. 1 is a sectional view showing a liquid crystal display apparatus 1 according to an embodiment of the invention.

Now referring to the drawings, preferred embodiments of the invention are described below.

FIG. 1 is a sectional view showing the structure of a liquid crystal display apparatus 1 according to an embodiment of the invention. The liquid crystal display apparatus 1 includes a first member 2 for converting polarization condition having a spectral member 6 and a reflecting member 7, a second member 3 for converting polarization condition, a liquid crystal display device 4, a polarizer 5 and a member 17 for optical compensation. The liquid crystal display device 4 is disposed between the first polarization condition converting member 2 and the polarizer 5. The second polarization condition converting member 3 is disposed between the converting member 2 and the liquid crystal display device 4. The optical compensation member 17 is disposed between the polarizer 5 and the liquid crystal display apparatus 4.

The first polarization condition converting member 2 converts all of the light of all the wavelengths in the visible range into circularly polarized light, and a light incident plane 6a of the spectral member 6 and a light reflecting plane 7a of the reflecting member 7 included in the converting member 2 are disposed at a distance L therebetween. The distance L is set substantially uniform in the plane.

Specifically, the spectral member 6 is realized by a polymer liquid crystal film formed of cholesteric liquid crystal whose molecules are twisted along the thickness, which film reflects one of the dextrorotatory circularly polarized light and the levorotatory circularly polarized light obtained by converting the light of all the wavelengths and transmits the other circularly polarized light. A polymer liquid crystal film, for example, as disclosed in Japanese Unexamined Patent Publication JP-A 6-281814 (1994) may be used. In the polymer liquid crystal film, the orientational pitch of the cholesteric liquid crystal molecules continuously increases or decreases along the thickness.

The reflecting member 7 is realized by a non-directional member which converts the one circularly polarized light into the other circularly polarized light and supplies the other circularly polarized light again to the spectral member 6 and in which a reflecting member 8 is disposed on a base member 9. The base member 9, for example, is formed of a synthetic resin and the reflecting member 8 is realized with a thin film of silver or the like.

The second polarization condition converting member 3 is realized by a ¼ wave plate composed of a uniaxially drawn polymer film, which plate converts the circularly polarized light obtained through the conversion by the converting member 2 into linearly polarized light.

The liquid crystal display device 4 includes light transmitting substrates 10 and 11, transparent electrodes 12 and 13, orientation films 14 and 15, and a liquid crystal layer 16. The electrodes 12 and 13 formed, for example, of indium tin oxide (ITO) are formed on one surfaces 10a and 11a of the substrates 10 and 11 formed, for example, of glass or plastic. The orientation films 14 and 15 made, for example, of polyimide are formed to cover the electrodes 12 and 13, respectively.

The electrodes 12 and 13 may have any configuration. One of the segment type, the simple matrix type and the active matrix type, for example, may be adopted. The surfaces of the orientation films 14 and 15 are orientation-processed by, for example, rubbing.

The substrates 10 and 11 on which the electrodes 12 and 13 and the orientation films 14 and 15 are formed are disposed so that the surfaces 10a and 11a of the substrates 10 and 11 are opposite to each other with the liquid crystal layer 16 therebetween. The liquid crystal layer 16 is formed, for example, of a liquid crystal material containing a levorotatory chiral material. The positional relationship between the substrates 10 and 11 is decided so that the liquid crystal molecules are twisted at a predetermined angle between the substrates 10 and 11. The twist angle of the liquid crystal molecules between the substrates 10 and 11 is between 180° and 270° when a STN type is adopted, and is substantially 90° when a TN type is adopted.

The product d·Δn of the thickness d of the liquid crystal layer 16 and the refractive index anisotropy Δn is between 0.77 $\mu$m and 0.90 $\mu$m. When d·Δn is smaller than 0.77 $\mu$m, the display is dark and when d·Δn is greater than 0.90 $\mu$m, sufficient contrast ratio is not obtained.

The optical compensation member 17 compensates for the coloration of the light having exited from the liquid crystal display device 4. In the liquid crystal display apparatus 1, the optical compensation member 17 includes a first compensating member 18 and a second compensating member 19. The compensating member 18 and 19 are each realized with a phase difference plate of a one-layer uniaxially drawn polymer film formed of polycarbonate, polyarylate or the like. The angle between the axes of retardation of the phase difference plates is preferably between 20° and 40°. By setting the angle within the range, black and white display is obtained which exhibits high uniformity in the plane.

To achieve achromatic display, the retardation values of the phase difference plates are preferably between 0.39 $\mu$m and 0.46 $\mu$m. When the retardation values are lower than 0.39 $\mu$m, the coloration of the light of short wavelength cannot be sufficiently compensated for, so that black, for example, becomes bluish. When the retardation values are higher than 0.46 $\mu$m, the coloration of the light of long wavelength cannot be sufficiently compensated for.

Figure 2:
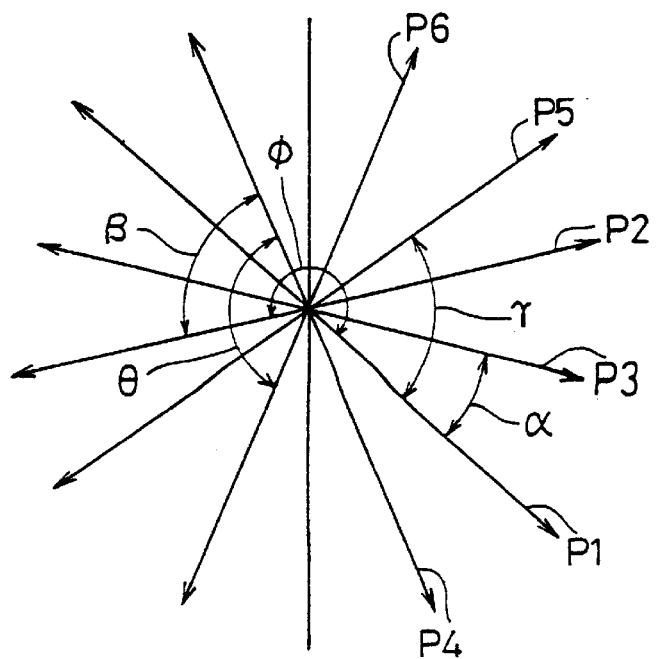
FIG. 2 shows a positional relationship of the liquid crystal display apparatus 1.

FIG. 2 shows a positional relationship of the liquid crystal display apparatus 1. The arrow P1 represents the axis of orientation of liquid crystal molecules proximate to the orientation film 15 on the side of the light transmitting substrate 11. The arrow P2 represents the axis of orientation of liquid crystal molecules proximate to the orientation film 14 on the side of the light transmitting substrate 10. The arrow P3 represents the axis of absorption of the polarizer 5. The arrow P4 represents the axis of retardation of the ¼ wave plate constituting the second polarization condition converting member 3. The arrow P5 represents the axis of retardation of the phase difference plate constituting the first compensating member 18. The arrow P6 represents the axis of retardation of the phase difference plate constituting the second compensating member 19.

The angle $\alpha$ represents the angle between the orientation axis P1 of the liquid crystal molecules proximate to the orientation film 15 and the absorption axis P3 of the polarizer 5. The angle $\beta$ represents the angle between the orientation axis P2 of the liquid crystal molecules proximate to the orientation film 14 and the slow axis P4 of the ¼ wave plate constituting the second polarization condition converting member 3. The angle $\gamma$ represents the angle between the orientation axis P1 of the liquid crystal molecules proximate to the orientation film 15 and the slow axis P5 of the phase difference plate constituting the first compensating member 18. The angle $\theta$ represents the angle between the slow axis P4 of the ¼ wave plate constituting the second polarization condition converting member 3 and the slow axis P6 of the phase difference plate constituting the second compensating member 19. The angle $\phi$ represents the angle between the orientation axis P1 of the liquid crystal molecules proximate to the orientation film 15 and the orientation axis P2 of the liquid crystal molecules proximate to the orientation film 14, i.e. the twist angle of the liquid crystal molecules.

Figure 3:
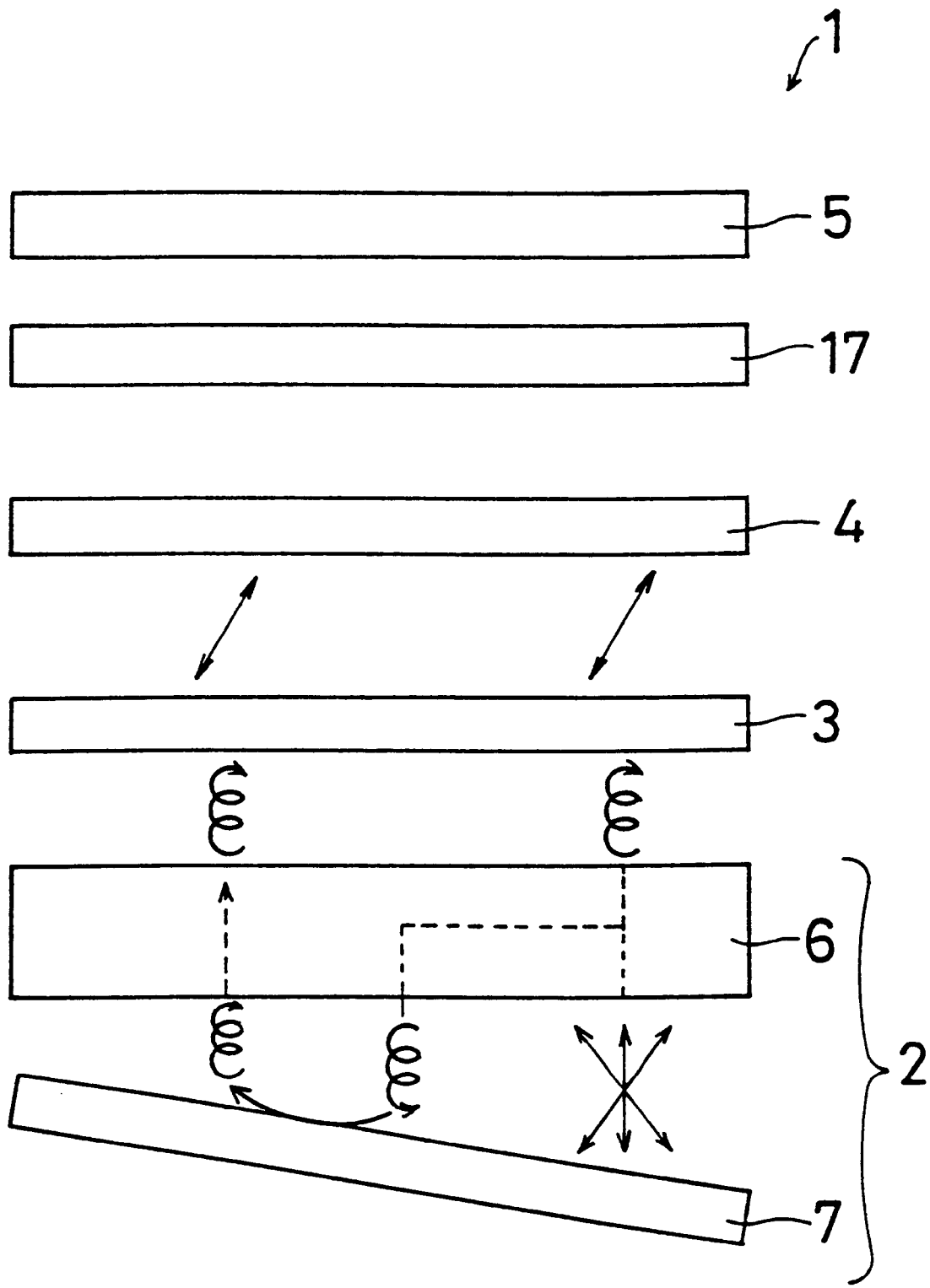
FIG. 3 is a view of assistance in explaining an operational principle of the liquid crystal display apparatus 1.

FIG. 3 is a view of assistance in explaining an operational principle of the liquid crystal display apparatus 1. The apparatus 1 is a display apparatus used as both transmission and reflection types. Like in the conventional transmission type, the light incident on the side of the polarizer 5 is transmitted by the optical compensation member 17, the liquid crystal display device 4, the second polarization condition converting member 3 and the first polarization condition converting member 2 in this order, and is then reflected by the reflecting member 7 of the converting member 2 and again transmitted by the first polarization condition converting member 2, the second polarization condition converting member 3, the liquid crystal display device 4, the optical compensation member 17 and the polarizer 5 in this order to exit from the liquid crystal display apparatus 1. Simultaneously therewith, the light is transmitted along a subsequently-described path to exit from the display apparatus 1.

That is, light is introduced from between the spectral member 6 and the reflecting member 7 of the first polarization condition converting member 2. At the spectral member 6, the light of all the wavelengths in the visible range is converted into circularly polarized light. Specifically, at the spectral member 6, one of the dextrorotatory circularly polarized light and the levorotatory circularly polarized light obtained through the conversion is reflected and the other circularly polarized light is transmitted. For example, the levorotatory circularly polarized light is transmitted and the dextrorotatory circularly polarized light is reflected. The reflected dextrorotatory circularly polarized light is converted into levorotatory circularly polarized light by being reflected by the reflecting member 7, and is again incident on the spectral member 6 to be transmitted thereby.

The levorotatory circularly polarized light having exited from the spectral member 6 is incident on the ¼ wave plate constituting the second polarization condition converting member 3 to be converted into linearly polarized light in a direction at 45° to a fast axis of the wave plate. Then, the linearly polarized light is supplied to the liquid crystal display device 4 and modulated according to the alignment of the liquid crystal molecules. Then, the coloration is compensated for by the optical compensation member 17 and the light exits via the polarizer 5.

By thus converting the dextrorotatory circularly polarized light reflected by the spectral member 6 into levorotatory circularly polarized light by the reflecting member 7 to be again incident on the spectral member 6 and then converting the levorotatory circularly polarized light into linearly polarized light by the ¼ wave plate, the incident light is all incident on the liquid crystal display device 4. Since the light passes through only one polarizer, in principle, approximately half of the light exits.

The spectral member 6 may be designed to reflect the levorotatory circularly polarized light and transmit the dextrorotatory circularly polarized light.

Figure 4:
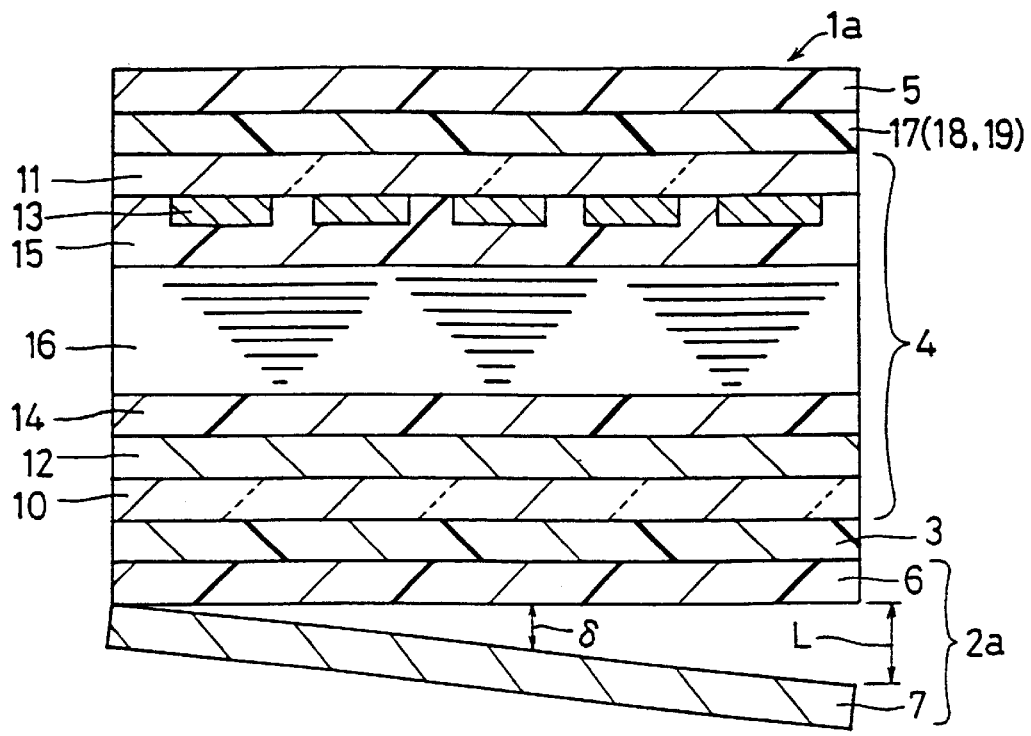
FIG. 4 is a sectional view showing a liquid crystal display apparatus 1a according to another embodiment of the invention.

FIG. 4 is a sectional view showing the structure of a liquid crystal display apparatus 1a according to another embodiment of the invention. The liquid crystal display apparatus 1a, including substantially the same structural members as those of the liquid crystal display apparatus 1, is characterized in that instead of the first polarization condition converting member 2, a first polarization condition converting member 2a is provided having the spectral member 6 and the reflecting member 7 disposed to form an angle δ. Similar members are denoted by the same reference designations and will not be described. Thus, one sides of the spectral member 6 and the reflecting member 7 abut each other and the other sides opposite to the one sides are disposed at a distance L therebetween so that the light is introduced from the side of the other sides disposed at the distance L therebetween.

Figure 5:
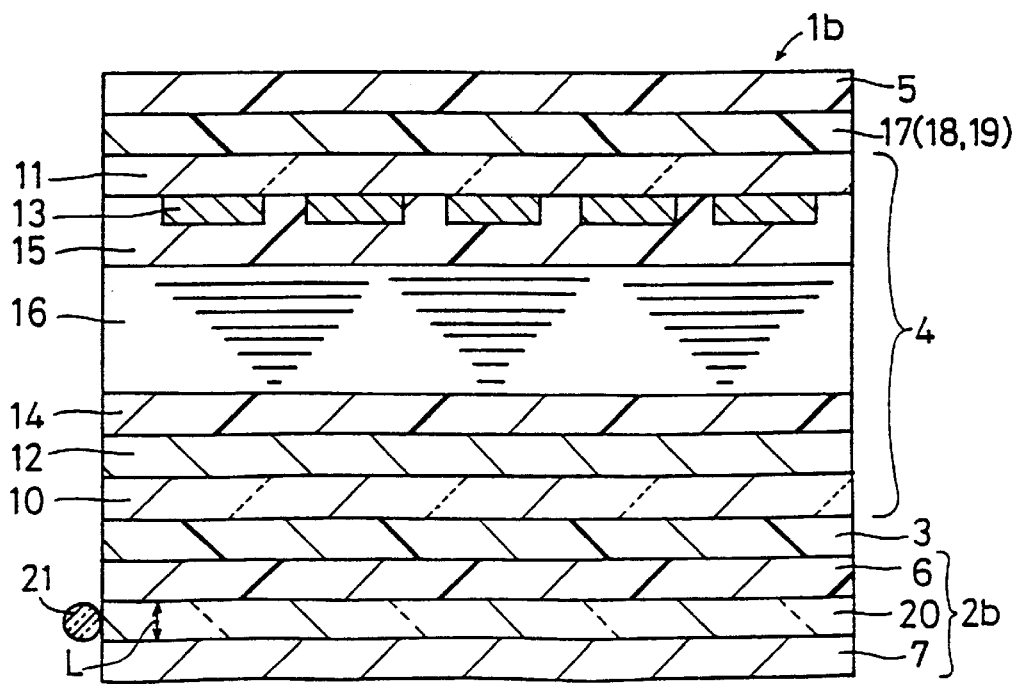
FIG. 5 is a sectional view showing a liquid crystal display apparatus 1b according to yet another embodiment of the invention.

FIG. 5 is a sectional view showing the structure of a liquid crystal display apparatus 1b according to yet another embodiment of the invention. The liquid crystal display apparatus 1b, including substantially the same structural members as those of the liquid crystal display apparatus 1, is characterized in that instead of the first polarization condition converting member 2, a first polarization condition converting member 2b is provided further having a light directing member 20 sandwiched between the spectral member 6 and the reflecting member 7 and that a light source 21 is disposed at a side of the light directing member 20. Similar members are denoted by the same reference designations and will not be described. Thus, the light from the light source 21 is introduced through the light directing member 20.

Figure 6:
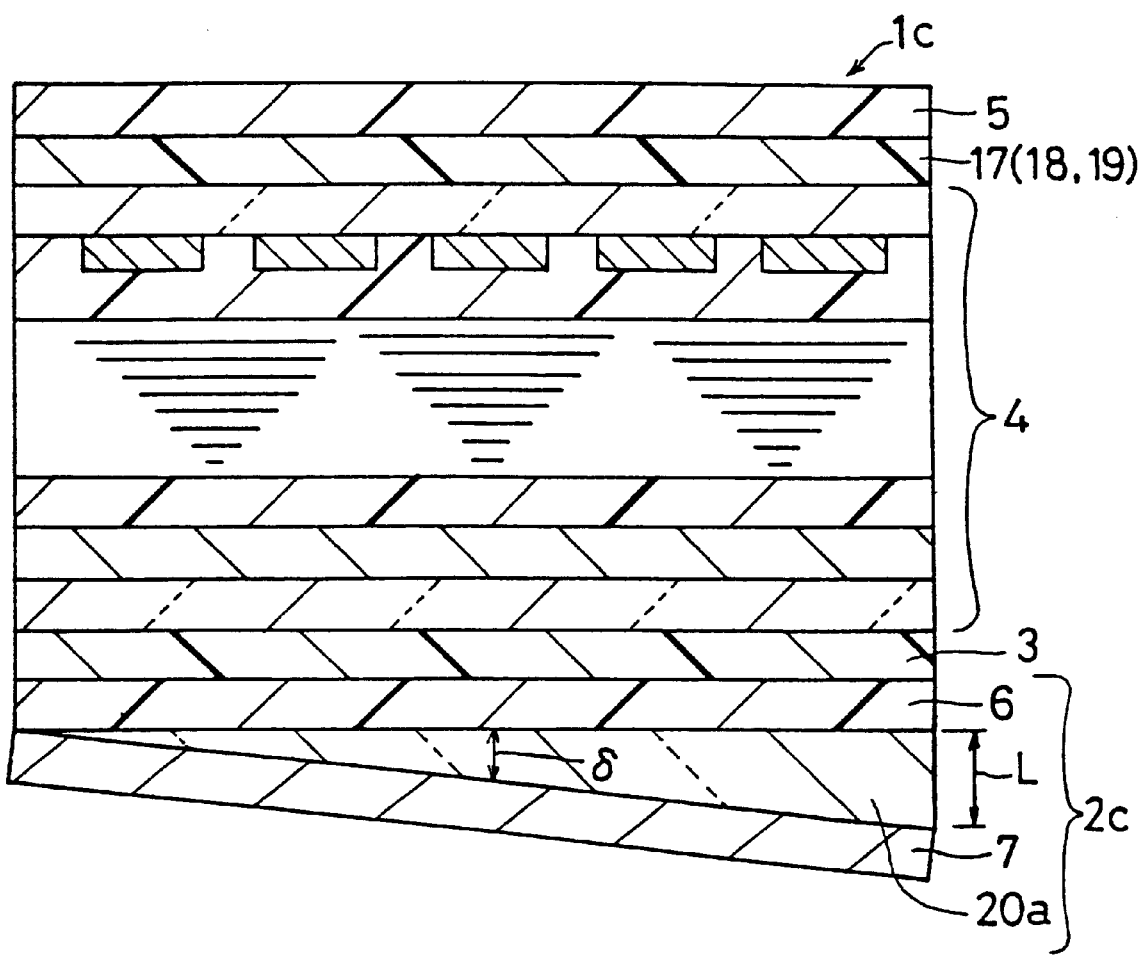
FIG. 6 is a sectional view showing a liquid crystal display apparatus 1c according to still another embodiment of the invention.

FIG. 6 is a sectional view showing the structure of a liquid crystal display apparatus 1c according to still another embodiment of the invention. The liquid crystal display apparatus 1c, including substantially the same structural members as those of the liquid crystal display apparatus 1, is characterized in that instead of the first polarization condition converting member 2, a first polarization condition converting member 2c is provided further having a wedge-shaped light directing member 20a sandwiched between the spectral member 6 and the reflecting member 7 disposed to form the angle δ. Similar members are denoted by the same reference designations and will not be described. Thus, one sides of the spectral member 6 and the reflecting member 7 abut each other and the other sides opposite to the one sides are disposed at the distance L therebetween so that the light is introduced through the light directing member 20a on the side of the other sides disposed at the distance L therebetween.

Figure 7:
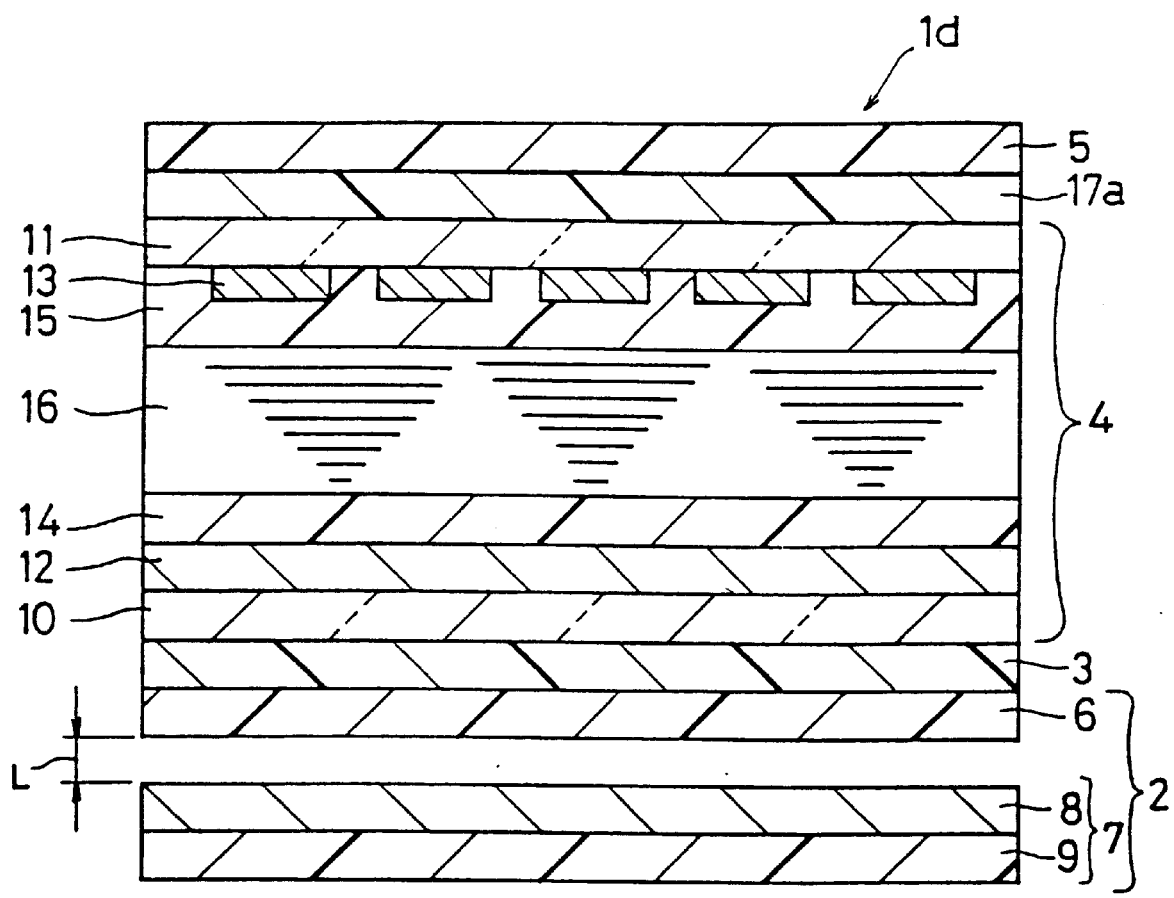
FIG. 7 is a sectional view showing a liquid crystal display apparatus 1d according to still another embodiment of the invention.

FIG. 7 is a sectional view showing the structure of a liquid crystal display apparatus 1d according to still another embodiment of the invention. The liquid crystal display apparatus 1d, including substantially the same structural members as those of the liquid crystal display apparatus 1, is characterized in that instead of the optical compensation member 17, a optical compensation member 17a is provided. Similar members are denoted by the same reference designations and will not be described. The optical compensation member 17a rotates the light in the opposite direction but at the same angle as the liquid crystal display device 4 and is realized, for example, by a twisted phase difference plate composed of a film wherein molecules are twisted along the thickness. The phase difference plate is realized, for example, by a film formed of a liquid crystal polymer material or a mixture of a liquid crystal polymer and a polymer.

The d·Δn of the liquid crystal display device 4 is between 0.77 μm and 0.90 μm and the retardation value of the optical compensation member 17a is between 0.89 and 0.95 times the d·Δn of the device 4. When the retardation value is lower than 0.89 times, the coloration is insufficiently compensated for when no voltage is applied, so that the contrast ratio decreases. When the retardation value is higher than 0.95 times, the coloration is insufficiently compensated for when voltage is applied, so that the luminance decreases and coloration occurs.

Figure 8:
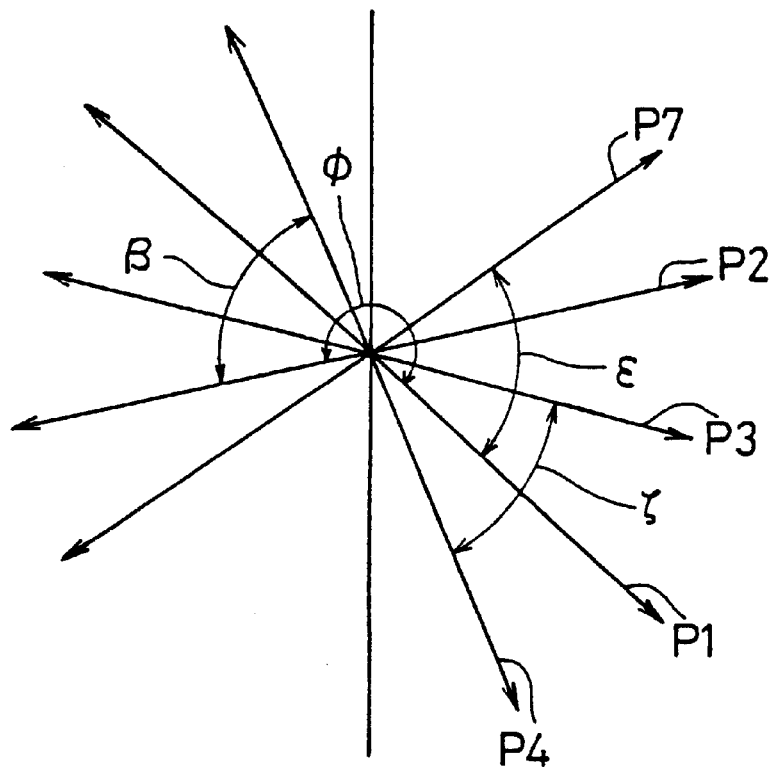
FIG. 8 shows a positional relationship of the liquid crystal display apparatus 1d.

FIG. 8 shows a positional relationship of the liquid crystal display apparatus 1d. The arrow P1 represents the axis of orientation of liquid crystal molecules proximate to the orientation film 15 on the side of the light transmitting substrate 11. The arrow P2 represents the axis of orientation of liquid crystal molecules proximate to the orientation film 14 on the side of the light transmitting substrate 10. The arrow P3 represents the axis of absorption of the polarizer 5. The arrow P4 represents the axis of retardation of the ¼ wave plate constituting the second polarization condition converting member 3. The arrow P7 represents a liquid crystal display device side axis of molecule orientation of the twisted phase difference plate constituting the optical compensation member 17a.

The angle β represents the angle between the orientation axis P2 of the liquid crystal molecules proximate to the orientation film 14 and the slow axis P4 of the ¼ wave plate constituting the second polarization condition converting member 3. The angle ε represents the angle between the orientation axis P1 of the liquid crystal molecules proximate to the orientation film 15 and the molecule orientation axis P7 of the phase difference plate constituting the optical compensation member 17a. The angle ζ represents the angle between the absorption axis P3 of the polarizer 5 and the slow axis P4 of the ¼ wave plate constituting the second polarization condition converting member 3. The angle φ represents the angle between the orientation axis P1 of the liquid crystal molecules proximate to the orientation film 15 and the orientation axis P2 of the liquid crystal molecules proximate to the orientation film 14, i.e. a twist angle of the liquid crystal molecules. For example, the angle ε is 90° and the angle ζ is 45°.

Figure 9:
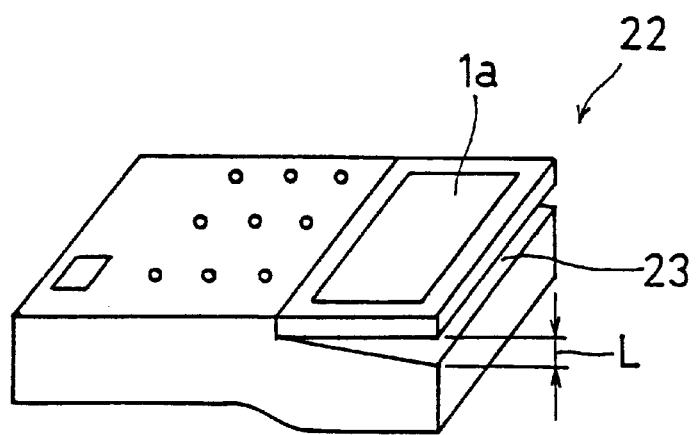

FIG. 9 is an external view showing a portable terminal apparatus 22 provided with the liquid crystal display apparatus 1a. The spectral member 6 and the reflecting member 7 of the apparatus 1a are disposed at a slanting distance L therebetween and light is introduced through a light introducing opening 23 corresponding to the distance to realize display. The terminal apparatus 22 is realized, for example, as a portable telephone or an electronic organizer. The terminal apparatus 22 may be arranged so that the light introducing opening 23 is formed as required.

Subsequently, first to ninth embodiments will be described.

First Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 30°, 85°, 105°, 70° and 240°, respectively. Consequently, the angle between the retardation axes P5 and P6 is 35°. The structure of the liquid crystal display apparatus 1a is adopted and tan $\delta$ is 0.577.

While the luminosity L of the background is 47 in a conventional liquid crystal display apparatus, the luminosity L is 52 in the liquid crystal display apparatus of the first embodiment.

Second Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 40°, 85°, 110°, 75° and 240°, respectively. Consequently, the angle between the retardation axes P5 and P6 is 35°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the second embodiment.

Third Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 50°, 85°, 110°, 80° and 240°, respectively. Consequently, the angle between the retardation axes P5 and P6 is 30°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the third embodiment.

Fourth Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 35°, 90°, 110°, 75° and 240°, respectively. Consequently, the angle between the retardation axes P5 and P6 is 35°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the fourth embodiment.

Fifth Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 40°, 90°, 105°, 70° and 240°, respectively. Consequently, the angle between the retardation axes P5 and P6 is 35°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the fifth embodiment.

Sixth Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 35°, 90°, 100°, 75° and 240°, respectively. Consequently, the angle between the retardation axes P5 and P6 is 25°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the sixth embodiment.

Seventh Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 55°, 80°, 110°, 85° and 240°, respectively. Consequently, the angle between the retardation axes P5 and P6 is 250. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the seventh embodiment.

Eighth Embodiment

The compensating member 18 and 19 are both realized with uniaxially drawn polyarylate having a retardation value of 430 nm and the second polarization condition converting member 3 is realized with uniaxially drawn polyvinyl alcohol. The angles $\alpha$, $\beta$, $\gamma$, $\theta$ and $\phi$ are 45°, 80°, 105°, 85° and 240°, respectively. Consequently, the angle between the retardation axes P5 and P6 is 20°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the eighth embodiment.

Ninth Embodiment

The compensating member 18 and 19 are both realized with uniaxially drawn polycarbonate having a retardation value of 425 nm and the second polarization condition converting member 3 is realized with uniaxially drawn polyvinyl alcohol. The angles $\alpha$, $\beta$, $\gamma$, $\theta$ and $\phi$ are 40°, 85°, 105°, 65° and 240°, respectively. Consequently, the angle between the retardation axes P5 and P6 is 40°. The structure of the liquid crystal display apparatus 1a is adopted and tan $\delta$ is 0.577.

While the luminosity L of the background is 47 in the conventional liquid crystal display apparatus, the luminosity L is 52 in the liquid crystal display apparatus of the ninth embodiment.

The luminosity L of the background is defined by the following expression (1) based on the uniform perception space of the CIE1976Lab display system (JIS Z8729-(1980)):

$$L = 116(Y/Y0)^{1/3} - 16 \quad (1)$$
$$a = 500[(X/X0)^{1/3} - (Y/Y0)^{1/3}]$$
$$b = 200[(Y/Y0)^{1/3} - (Z/Z0)^{1/3}]$$

where X0, Y0 and Z0 are three stimulus values of the standard light source used for lighting, and X, Y and Z are three stimulus values of the object.

In the conventional liquid crystal display apparatus, a polarizer, a liquid crystal display device, a polarizer and a reflector are disposed in this order to form a STN type.

With the liquid crystal display apparatuses of the first to ninth embodiments, display is obtained being sharp and having high luminosity and bright background compared with the conventional liquid crystal display apparatus. Particularly, with a conventional liquid crystal display apparatus of the type where another polarizer is disposed on the side of the reflector so that a total of two polarizer are used, it is difficult to achieve a background luminosity of 50 or higher. Thus, the luminosity L=52 achieved by the embodiments of the invention is an extremely bright value.

As described above, according to the embodiments of the invention, since the positional relationship among the structural members of the liquid crystal display apparatus is optimized, the tone of background of the STN liquid crystal display apparatus when no voltage is applied is brighter and approaches achromatic, so that stable black and white display is realized. The liquid crystal display apparatuses are used as both the transmission and reflection types. When the apparatuses are used as the reflection type, display is realized with the same amount of incident light as the conventional display apparatus. When the brightness is insufficient for the reflection type, the display apparatus is used also as the transmission type and by also using the light introduced from between the spectral member 6 and the reflecting member 7 to increase the brightness, display is realized.

The invention is not limited to the STN type but may be applied to the TN type. In this case, the same advantages as those of the STN type are obtained.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A transmission, reflection-type liquid crystal display apparatus comprising in the following order:

first means for converting all of the light of all wavelengths in a visible range into circularly polarized light;

second means for converting the circularly polarized light obtained through conversion by the first converting means into linearly polarized light;

a liquid crystal display device for modulating the linearly polarized light obtained through conversion by the second converting means; and a polarizer for controlling transmission and blocking of the light which has exited from the liquid crystal display device, wherein the first conversion means includes:

spectral means for reflecting one of dextrorotary circularly polarized light and levorotary circularly polarized light of the circularly polarized light, the spectral means being composed of a polymer liquid crystal film formed of cholesteric liquid crystal whose liquid crystal molecules are twisted along a thickness;

reflecting means disposed at a distance from the spectral means for converting the one circularly polarized light reflected by the spectral means into the other circularly polarized light to supply the other circularly polarized light again to the spectral means; and ambient light introducing means for effectively introducing ambient light into a gap between the spectral means and the reflecting means, wherein the second converting means is composed of a ¼ wave plate formed of a uniaxially drawn polymer film;

wherein a portion of the light used to illuminate the liquid crystal display device passes through the liquid crystal display device only once.

2. The reflection-type liquid crystal display apparatus of claim 1, wherein said spectral means and said reflection means are disposed at an angle to each other to provide an opening through which light can be directed between said spectral means and said reflection means to reflect from said reflection means through said spectral means and said liquid crystal display device.

3. A transmission, reflecting-type liquid crystal display apparatus consisting essentially of and in the following order:

first means for converting all of the light of all wavelengths in a visible range into circularly polarized light;

second means for converting the circularly polarized light obtained through conversion by the first converting means into linearly polarized light;

a liquid crystal display device for modulating the linearly polarized light obtained through conversion by the second converting means;

optical compensation means for compensating coloration of light having exited from the liquid crystal display device; and a polarizer for controlling transmission and blocking of the light which has exited from the liquid crystal display device, wherein the first conversion means includes:

spectral means for reflecting one of dextrorotary circularly polarized light and levorotary circularly polarized light of the circularly polarized light, the spectral means being composed of a polymer liquid crystal film formed of cholesteric liquid crystal whose liquid crystal molecules are twisted along a thickness;

reflecting means disposed at a distance from the spectral means for converting the one circularly polarized light reflected by the spectral means into the other circularly polarized light to supply the other circularly polarized light again to the spectral means; and ambient light introducing means for effectively introducing ambient light into a gap between the spectral means and the reflecting means, wherein the second converting means is composed of a ¼ wave plate formed of a uniaxially drawn polymer film, and wherein the polarizer controls transmission and blocking of the light whose compensation has been conducted by the optical compensation means;

wherein a portion of the light used to illuminate the liquid crystal display device passes through the liquid crystal display device only once.

4. The reflection-type liquid crystal display apparatus of claim 3, wherein said spectral means and said reflection means are disposed at an angle to each other to provide an opening through which light can be directed between said spectral means and said reflection means to reflect from said reflection means through said spectral means and said liquid crystal display device.

5. A terminal apparatus comprising a reflecting-type liquid crystal display apparatus having a spectral means and a reflecting means, and ambient light introducing means for effectively introducing ambient light into a gap between the spectral means and the reflecting means of the liquid display apparatus:

the reflecting-type liquid crystal display apparatus comprising in the following order:

first means for converting all of the light of all wavelengths in a visible range into circularly polarized light;

second means for converting the circularly polarized light obtained through conversion by the first converting means into linearly polarized light;

a liquid crystal display device for modulating the linearly polarized light obtained through conversion by the second converting means; and a polarizer for controlling transmission and blocking of the light which has exited from the liquid crystal display device, wherein the first conversion means includes:

spectral means for reflecting one of dextrorotary circularly polarized light and levorotary circularly polarized light of the circularly polarized light, the spectral means being composed of a polymer liquid crystal film formed of cholesteric liquid crystal whose liquid crystal molecules are twisted along a thickness; and reflecting means disposed at a distance from the spectral means for converting the one circularly polarized light reflected by the spectral means into the other circularly polarized light to supply the other circularly polarized light again to the spectral means, and wherein the second converting means is composed of a ¼ wave plate formed of a uniaxially drawn polymer film.

6. The terminal apparatus of claim 5, wherein a light incident plane of the spectral means and a light reflecting plane of the reflecting means are disposed opposite to each other to form a predetermined angle.

7. The terminal apparatus of claim 5, further comprising a light source, wherein the first converting means further includes means disposed between the spectral means and the reflecting means for directing the incident light from the light source.

8. The terminal apparatus of claim 5, further comprising optical compensation means for compensating coloration of light having exited from the liquid crystal display device, wherein the polarizer controls transmission and block of the light whose coloration compensation has been conducted by the optical compensation means.

9. The terminal apparatus of claim 8, wherein a product d·Δn of a thickness d of a liquid crystal layer of the liquid crystal display device and a refractive index anisotropy Δn is selected to be in a range between 0.77 μm and 0.90 μm, the optical compensation means has two phase difference plates each having a retardation value which is selected to be in a range between 0.39 μm and 0.46 μm, and an angle between axes of retardation of the phase difference plates is selected to be in a range between 20° and 40°.

10. The terminal apparatus of claim 18, wherein a product d·Δn of a thickness d of a liquid crystal layer of the liquid crystal display device and a refractive index anisotropy Δn is selected to be in a range between 0.77 μm and 0.90 μm, and the optical compensation means has a retardation value which is selected to be in a range between 0.89 and 0.95 times the product d·Δn of the thickness d of the liquid crystal layer of the liquid crystal display device and the refractive index anisotropy Δn and rotates light in an opposite direction but by the same angle as in the liquid crystal display device.

11. The terminal apparatus of claim 5, wherein said spectral means and said reflection means are disposed at an angle to each other to provide an opening through which light can be directed between said spectral means and said reflection means to reflect from said reflection means through said spectral means and said liquid crystal display device.

* * * * *